United States Patent [19]

Dean et al.

[11] 4,324,561

[45] Apr. 13, 1982

[54] COMBUSTIBLE FUEL PELLETS FORMED FROM BOTANICAL MATERIAL

[75] Inventors: John J. Dean; Lloyd M. Helzig, both of Springfield, Oreg.

[73] Assignee: NIPAC, Ltd., Eugene, Oreg.

[21] Appl. No.: 171,730

[22] Filed: Jul. 24, 1980

Related U.S. Application Data

[60] Continuation of Ser. No. 1,962, Jan. 8, 1979, abandoned, which is a division of Ser. No. 770,990, Feb. 22, 1977, Pat. No. 4,211,740, which is a continuation-in-part of Ser. No. 590,511, Jun. 26, 1975, abandoned.

[51] Int. Cl.³ .............................................. C10L 5/08
[52] U.S. Cl. .................................... 44/10 E; 44/10 B; 44/10 H
[58] Field of Search ............... 44/1 E, 10 A, 10 E, 44/10 B, 10 H

[56] References Cited

U.S. PATENT DOCUMENTS 3,947,255  3/1976  Hartman et al. ................. 44/10 H
4,015,951  4/1977  Gunnerman ..................... 44/10 E

OTHER PUBLICATIONS

"Bark Pelleting", Better Fibers, Jul. 1961, Sprout-Waldron & Co., Inc., Muncy, Pa., 4 pages.
"Converting Bark", Steffensen, L. H., 1971, Oregon State Univ., Corvallis, pp. 97-98.

*Primary Examiner*—Carl F. Dees
*Attorney, Agent, or Firm*—Seed, Berry, Vernon & Baynham

[57] ABSTRACT

A process and apparatus for pelletizing tree bark and other botanical material for use as an industrial fuel. A dryer burning fines from the final product is used to heat bark or other botanical material which is typically a waste product from lumbering or agricultural production. Once dried, the material is finely ground, preheated and forced through a pelletizing mill to create a pelletized product having a diameter of approximately 0.635 cm. The pellets are then cooled and leave the process. Several pelletizing mills are disclosed which are situated to trap the dried material against at least one die such that there will be a continuous, positive feed of material into the die. The resulting product may be substituted for coal as a heating source.

5 Claims, 15 Drawing Figures

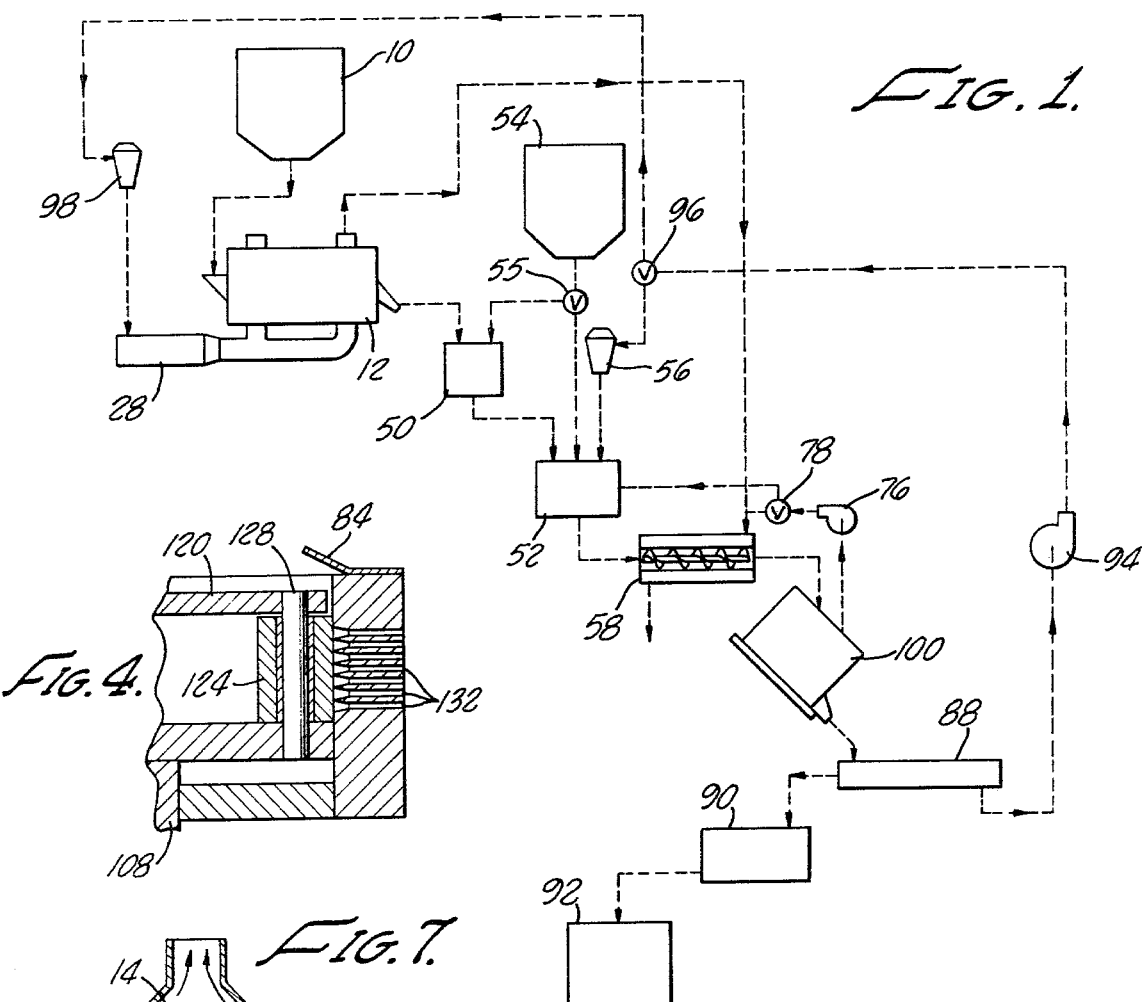
FIG. 1.
FIG. 4.
FIG. 7.
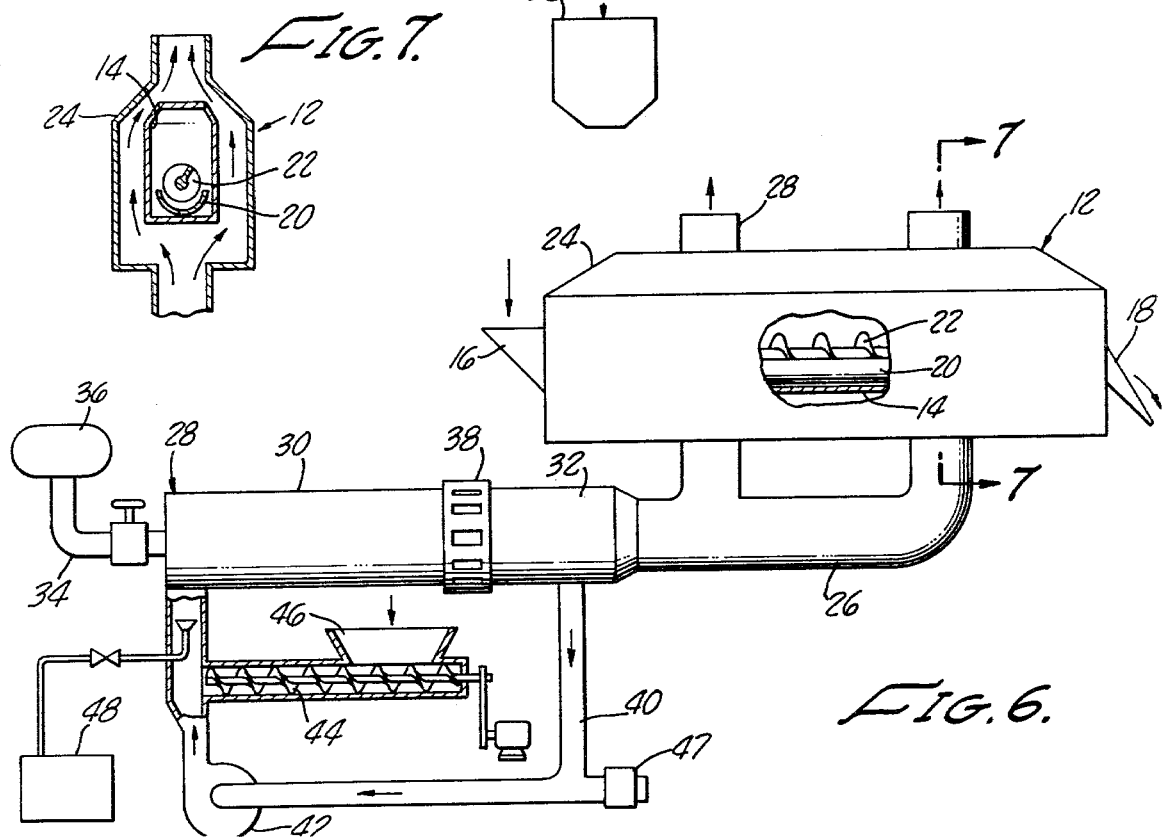
FIG. 6.

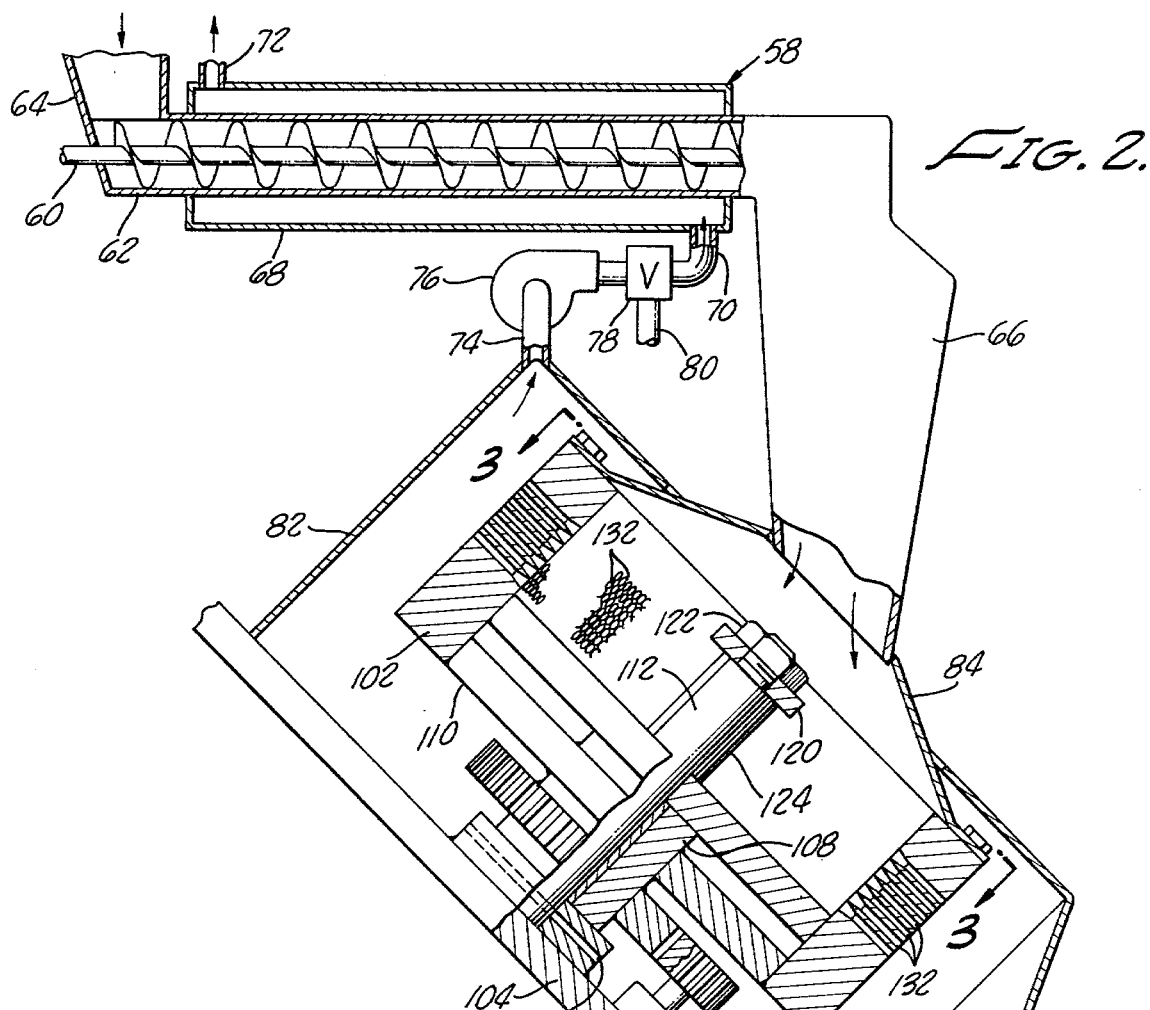
FIG. 2.
FIG. 3.
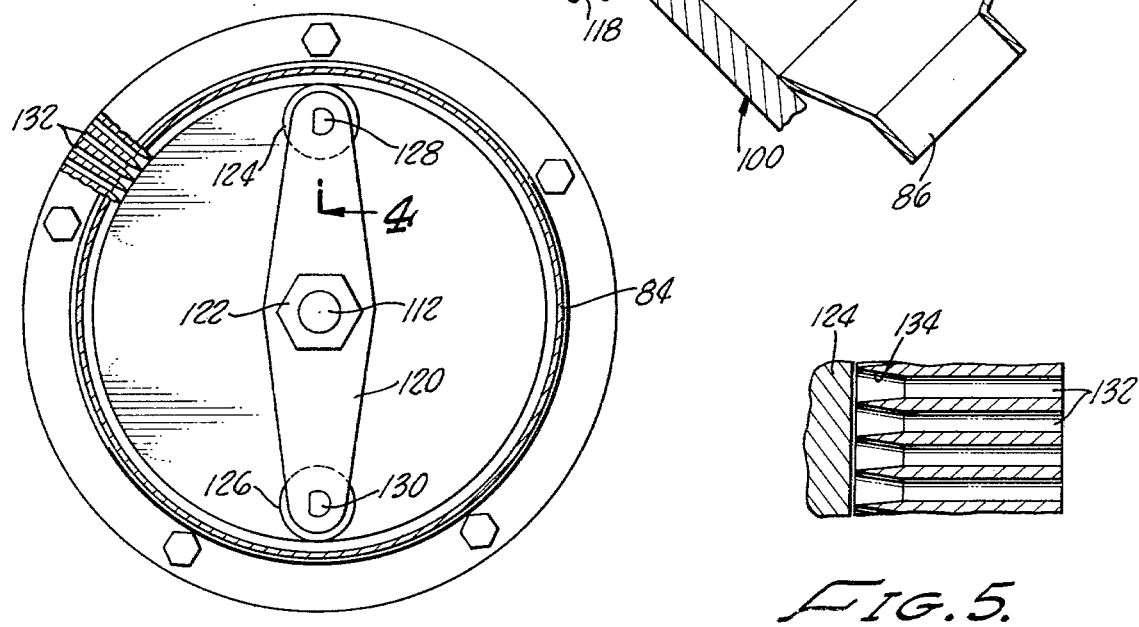
FIG. 5.

COMBUSTIBLE FUEL PELLETS FORMED FROM BOTANICAL MATERIAL

This is a continuation of application Ser. No. 1,962, filed Jan. 8, 1979 and now abandoned, which application is a divisional application of Ser. No. 770,990, filed on Feb. 22, 1977 now U.S. Pat. No. 4,211,740 and application Ser. No. 770,990 is a continuation of an original application Ser. No. 590,511 filed on June 26, 1975 and now abandoned.

BACKGROUND OF THE INVENTION

The present invention is directed to process and apparatus for pelletizing botanical material for use as an industrial fuel. It has long been thought desirable to convert botanical waste such as tree bark, wood fiber, straw and agricultural waste such as root greens and the like into a state useable as industrial fuel. Fireplace logs created from wood chips have been widely used for some period of time. More recently, pelletizing processes have been used for creating recreational fuels. These fuels generally are not uniform in density, require some added binder to hold the product together, and do not have a heat capacity approaching that of coal. The diameter of these pelletized products is normally at least 6 cm. Such pelletized fuels are satisfactory for recreational uses such as campfires and crude stoves; however, the size, non-uniform density and heat content make such fuels impractical as a replacement for coal. Some pelletized materials have been developed which have a smaller cross-sectional dimension and are relatively dry. These products have been used to some extent to replace soft coal in certain applications. However, a good quality and inexpensive replacement for coal made from botanical materials has not been previously available.

SUMMARY OF THE INVENTION

The present invention is directed to a process and apparatus for conditioning and pelletizing tree bark and other botanical material for use as an industrial fuel. By the present process, a product of uniform density and high heat value is produced which may be substituted for coal as a combustible heat source. Tree bark, wood fiber, straw, agricultural waste or other botanical materials, may be subjected to drying, grinding, heating, compressing and forming processes to produce dense, dry pellets having proper combustion characteristics and substantial heat content for use as a coal substitute. The several steps involved are designed to provide a heated, exceptionally dry and finely ground material under positive feed conditions to a pelletizing die. The dryness of the incoming material and its elevated temperature cause the natural binders found in such organic material to begin to soften into a plastic state as a means for binding the ground fibers together into a uniform pellet. The fine grinding of the material further enhances this pelletizing process.

The mills themselves are oriented and designed such that the incoming material is forced by gravity or centrifugal force to remain in and force against the nip area of the pelletizing die apparatus. In one embodiment, a conventional pelletizing mill has been tipped such that the normally horizontal axis of the die becomes oriented at a 45° elevation. Other embodiments include the use of two dies in rolling contact with material being fed into the nip area from above. Another embodiment employs a piston extrusion device where a material is continuously forced into contact with the die. This continuous feeding prevents the blocking of the die passageways which might otherwise occur due to the dryness, compaction and elevated temperature of the material being pelletized.

In order that proper combustion properties may be achieved, it has been found advantageous to limit the pellets to a diameter of approximately 0.635 cm. (¼ in.). In this way, a uniform density is achieved in each pellet and the heating of the resins, natural thermoplastics and other binders to a plasticized state is more uniform as the smaller pellet is compressed through a die passageway. The small pellet size also results in a low shipping bulk per pound of material and a better combustion pattern when used as fuel because the burning pellet does not form a large insulating ash. Larger pellets may be used for less sophisticated furnaces and the like where a longer burn is desired.

Advantageous use is made of certain products of the process such that an entire system may be designed as substantially self-sufficient except for the necessary electrical input to drive several mechanical devices. Specifically, undersized particles or fines produced by the pelletizing mill may be employed as a fuel source for heating the incoming material. Also, the pelletizing mill itself generates substantial heat which may be directed to the material coming into the pelletizing mill as a means for preheating that material. Heat from the dryers may also be used for such purpose.

Accordingly, it is an object of the present invention to provide a process and apparatus for producing industrial fuel from waste bark or other botanical materials.

It is another object of the present invention to provide a number of mill structures designed for positive feed of incoming material to dies for the creation of industrial fuel products.

It is a further object of the present invention to provide a substantially self-contained processing system for the recovery of waste products.

Other objects and advantages will appear hereinafter.

BRIEF DESCRIPTION OF THE DRAWINGS

FIG. 1 is a schematic of the process of the present invention.

FIG. 2 is a cross-sectional elevation of a feed system and pelletizing mill.

FIG. 3 is a cross-sectional plan taken along line 3—3 of FIG. 2.

FIG. 4 is a corss-sectional elevation taken along line 4—4 of FIG. 3.

FIG. 5 is a detail view of a plurality of die passageways from the pelletizing mill.

FIG. 6 is an elevation of a burner and dryer assembly.

FIG. 7 is a cross-sectional elevation taken along line 7—7 of FIG. 6.

DETAILED DESCRIPTION OF THE DRAWINGS

Figure 8:
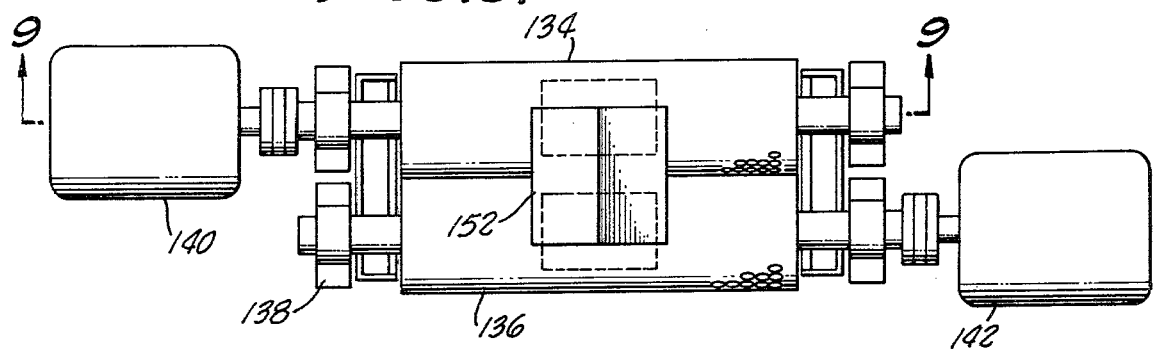
FIG. 8 is a plan of a second embodiment of a pelletizing mill.

Turning in detail to the drawings, FIG. 1 illustrates one form of the overall system of the present invention. A bin 10 provides a storage facility and source for wet bark, hog fuel, straw, and other botanical materials. This bin 10 is of conventional design and is equipped with the facility for distributing the botanical material contained therein at a constant rate to a dryer 12.

The dryer 12, best seen in FIGS. 6 and 7, has an inner cavity 14 extending from dryer inlet 16 to dryer outlet 18. An arcuate channel 20 is positioned along the bottom of the inner cavity 14 and partially surrounds a conveying screw 22 which is employed to advance the drying material along the circular channel 20 to the dryer outlet 18. A dryer housing 24 extends about the inner cavity 14 and is spaced therefrom to allow hot air to pass across the bottom of the inner cavity 14, along its sides and subsequently away from the inner cavity 14. The inner cavity 14 is separated from the heated air; and exhaust of the moisture from within the inner cavity 14 is advantageous. A low pressure fan employed to slowly draw the moisture laden air from the inner cavity has been found satisfactory.

An inlet manifold 26 distributes hot air to the volume between the dryer housing 24 and the inner cavity 14 at the lower side thereof. In this way, hot air is caused to flow across the underside of the inner cavity 14 for conducting heat to the material contained within the arcuate channel 20. The air passing along the sides of the inner cavity 14 heats the walls thereof such that radiant heat energy is also directed at the material for drying thereof. Exit ports 28 are provided at the upper portion of the dryer housing 24 for escape of the cooled air.

The high temperature air supplied to manifold 26 is provided by an injection burner generally designated 28. The injection burner 28 includes a main burner chamber 30 and an afterburner chamber 32. Air is provided through burner air inlet 34 from a high pressure source 36. Afterburner air is introduced through a control ring 38. Hot gases are returned to the inlet end of the burner through passageway 40 and pump 42. Solid fuel is introduced to the hot gases by means of a conveyor screw 44 from hopper 46. A valve 47 moderates the temperature of the returned gases by admitting ambient air. An ignition means 48 used to start the burner extends into the passageway 40.

The dryer 12 may be run at varying speeds and with varying amounts of heat input from the injection burner 28 to obtain the desired moisture content of the material passing therethrough. The moisture content of the material exiting from the dryer 12 may be around 12% as further moisture is removed incidental to later processing steps. However, lower moisture levels, even below 10%, are sometimes of benefit to achieve a lower shipping weight for the pelletized material and a higher heat output per pound.

From the dryer 12, the material proceeds to a hammer mill 50 of conventional design. For wood fiber, straw and agricultural wastes, a screen having openings of 0.48 cm. (3/16 in.) has been found to be preferred. For bark in general a screen having openings of 0.95 cm. (⅜ in.) is sufficient except for redwood and cedar bark. With redwood and cedar bark; the nature of the fibers necessitates a first grinding in a hammer mill having a more coarse screen. A screen having openings of 2.54 cm. (1 in.) has been found to be adequate. The 0.95 cm. (⅜ in.) screen opening may then be employed for a second pass with redwood and cedar bark.

The resulting particles derived from the hammer mill have a maximum screen size approaching the screen opening size. However, because the material is first dried, it tends to break into much finer particles on the average with a substantial amount of dust-like particles created. These finer particles are of benefit in the pelletizing mill as will be further discussed below.

From the hammer mill 50, the ground material is preferably introduced to a blender 52. The blender is used to mix various components which may be introduced thereto, attain a uniform temperature in the material and act as a supply reservoir within the feed system. A second dry material bin 54 may feed low moisture content materials such as straw directly into the blender 52 without passing them first through a dryer. Such dry material may have to be ground first and a valve 55 is provided to direct material to the hammer mill 50 when needed. Further, fines separated from the finished product may be directed into the blender through a cyclone separator 56. When dry material is added, the moisture content of the material from the dryer may be accordingly higher.

Following the blender 56, there is a positive feed system 58 as can best be seen in FIG. 2 for feeding the pelletizing mill. In the present embodiment, the positive feed system 58 includes a conveyor screw 60 for forcing the dried and ground material through a cylindrical passageway 62. A hopper 64 feeds material into the screw and passageway system. The screw and passageway system then transports this material to a chute 66 where it is directed into a pelletizing mill.

In order that the botanical material will remain as a pellet once passed through the pelletizing die, it is advantageous to heat the material during or in preparation for the pelletizing step prior to the entry of the material into the die passageways. This heating will initiate the plasticizing of in situ resins and natural thermoplastics in the botanical material. It is these resins and thermoplastics which will form the binder for the pellets. Furthermore, the early plasticizing of these binders helps allow the material to be compressed into the die passageways and insures that the pellet will also be properly bound.

A substantial amount of heating occurs in the die passageways because of the compressional heating and friction. However, to assure a uniform product, heating of the material before entering the die passageways is advantageous. The heat evolved from the mill may be used to support this essential heating. In the pelletizing mill illustrated in FIG. 2, the incoming material is held within the die itself and gains heat directly from the walls of the pelletizing die. However, further heating is advantageous. To accomplish such preheating, a jacket 68 may be positioned about the cylindrical passageway 62. This jacket 68 is cylindrical in nature and closed at either end. An inlet 70 is provided at one point through the wall of the jacket 68 and outlet 72 is provided at a second point through the wall of the jacket 68. Any heated fluid may be passed through this jacket 68; however, it is convenient and economical to direct heated air from the pelletizing mill by means of an air duct 74 and a blower 76.

It has been found that a preheating of wood bark to around 93° C. (200° F.) is sufficient to initiate this transition of the resins and thermoplastics for adequate binding of the final pellets. For wood fibers, the preferred temperature is around 121° C. (225° F.). Higher temperatures may well initiate a greater plasticizing of the resin and thermoplastic materials; however, as the compression and friction experienced in the pelletizing mill adds further heat to the material, the preheating temperature must not be so great as to cause the material to reach a flash point in the mill.

The added heat in the pelletizing mill further activates the resin and thermoplastics to insure proper binding of the fibers. This activity of the plasticized material is enhanced by the thorough grinding received in the hammer mill 50 because the binding materials are more easily separated from small particles of fiber.

The heating system for the positive feed system 58 includes a valve 78 and an air duct 80. The air duct 80 extends to the blender 52. In this way, the valve 78 may be controlled to regulate the amount of heat directed to the positive feed system 58. The excess heat can then be used to warm the material in the blender.

The various processes through which the material is subjected between the dryer 12 and the pelletizing mill all have a tendency to further reduce the moisture content of the material. Furthermore, the material exiting from the dryers remains hot for some period of time and moisture continues to be involved while the temperature of the material remains high. The heat generated within the pelletizing mill by compression and friction of the material further drives moisture from the material during the pelletizing step. Consequently, the moisture content of the material as it is being pelletized is estimated to be around 10%. Thus, the preheat process and the grinding process following the drying of the material have a significant influence on the eventual moisture content of the pellets as they are formed. As the moisture content is reduced, the degree of compaction increases, the transporting weight is less and the heat which can be generated per pound is greater. Further, there is not adverse effect on the binding process with the moisture at this low level.

A pelletizer mill housing 82 extends around each of the several forms of pelletizer mills. Such a housing 82 is only shown in FIG. 2. The housing 82 covers substantially all of the mill in order that all heat generated by the mill may be withdrawn for the preheated step as previously described. An inlet 84 receives incoming material from the chute 66 and an outlet 86 allows gravity discharge of the finished pellets.

Ignoring for a moment the pelletizing mill itself, pelletized material is discharged through outlet 86 to a conventional screening apparatus 88 for the separation of fines from the properly sized pellets. With the pellets of the preferred embodiment having a diameter of approximately 0.635 cm. (¼ in.), the openings in the screens should not closely approach this dimension. Once screened, the properly sized pellets are conveyed to a dry, cooling apparatus 90 to insure proper rehardening of the resins and natural thermoplastic materials in the pellets. The cool pellets are then directed to a bin 92 for storage and periodic removal.

The fines derived from the screening apparatus 88 are carried in an air suspension system driven by a blower 94 to a valve 96. At the valve 96, sufficient fines are directed to a cyclone separator 98 and then to the hopper 46 of the injection burner 28 to support the dryer 12. The use of the fines in this manner alleviates the need for having a separate fuel supply for the burner except for a small source of oil necessary to momentarily use the ignition means 48. The remaining fines may be recycled to the blender 52 through a cyclone separator 56.

Turning to the pelletizing mills, FIG. 2 illustrates a first pelletizing mill generally designated 100. The mill 100 includes a single die 102 rotatably mounted relative to a base 104. The die 102 is annular in construction and is supported by a hub 108 and coupled to the die 102 through a circular plate 110. The hub 108 is journaled about a post 112 fixed to the base 104 such that the post 112 may rotate when a shear pin 114 fails due to an excessive loading of the mill. A bushing 116 reduces friction between the hub 108 and the post 112. The die 102 is driven at speeds from 200 to 600 rpm by a spur and pinion gear train which in turn derives power from a drive shaft 18. A spider 120 is fixed to the post 112 at fastener 122. Idler rollers 124 and 126 are at either end of the spider 120 and are caused to rotate with the rotation of the die 102. Each idler roller 124 and 126 is journaled about an axle 128 and 130 respectively. A clearance of 0.0635 cm. (0.025 in.) exists between each of the rollers 124 and 126 and the inner surface of the die 102. Mills of this general configuration are well known.

The die 102 of this embodiment has an inner diameter of approximately 40.6 cm. (16 in.) and a wall thickness of 6.35 cm. (2.5 in.). There are eight die passageways, 132 in each row, extending across approximately 6.35 cm. (2.5 in.). The rows extend completely about the die. Each passageway is positioned as close as possible to all adjacent passageways such that a minimum amount of flat surface area remains on the inner surface of the die 102.

Each die passageway 132 has a first frustoconical portion 134 with a base of approximately 0.95 cm. (⅜ in.) with a half cone angle of 7°. The frustoconical portion 134 narrows to the main, cylindrical die passageway 132 which has a nominal diameter of 0.635 cm. (¼ in.).

The conventional position for such a pelletizing die is with the axis about which the die rotates being horizontal. In order to create a positive feed to the plurality of die passsageways 132, the pelletizing mill of the present invention has been tipped from its conventional orientation such that the axis about which the die 102 rotates is at an elevation of around 45° from the horizontal. It is believed that even greater elevations are possible and may be of greater benefit. In the present system, material is fed through chute 66 to fill the cavity within the die 102. The presence of this much material in the die cavity forces a portion of this material against the inner wall of the die to be presented to the nip areas between each roller 124 and 126 and the die 102. The rotating die 102 also induces rotation in the mass of material contained therein. This rotation creates centrifugal forces in the material further forcing the material into the nip areas of the mill. In this way, continuous feed to the passageway 132 is insured.

Figure 9:
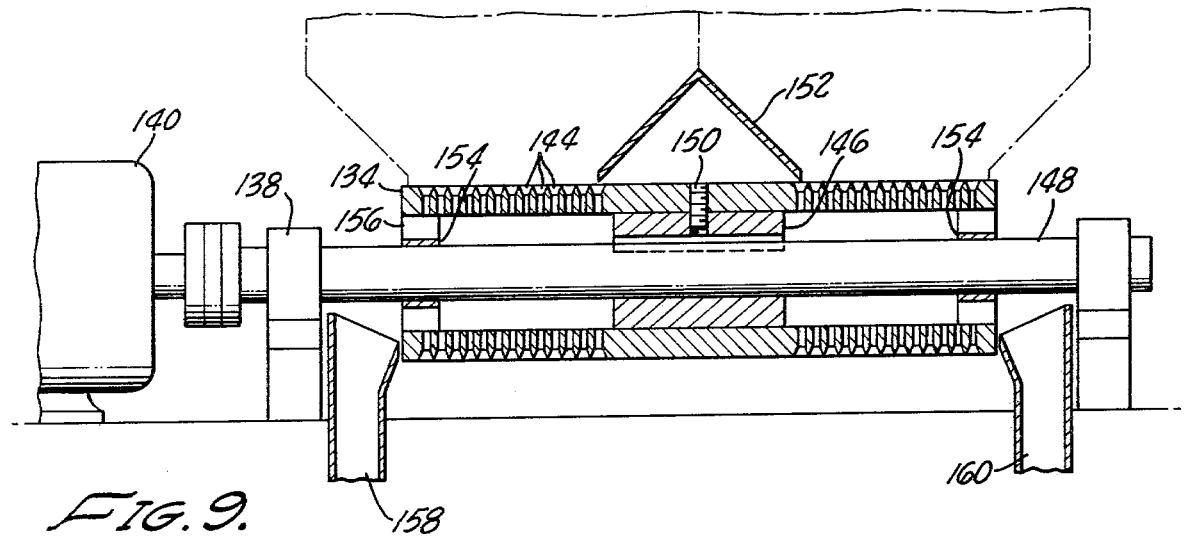
FIG. 9 is a cross-sectional elevation taken along 9—9 of FIG. 8.
Figure 10:
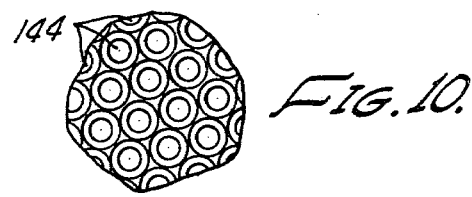
FIG. 10 is a detail of the surface of a pelletizing die.

Looking to the other pelletizing mill embodiments and specifically to FIGS. 8, 9, and 10, a pelletizing mill is illustrated as including two cylindrical dies 134 and 136. The dies 134 and 136 are rotatably mounted in bearings 138 and are held in rolling contact. Two drive motors 140 and 142 are shown which are to be driven at the same speed. Naturally, a single motor with a gear drive may be employed to run both dies.

The dies 134 and 136 each have die passageways 144 identical to those described for the pelletizing mill of FIG. 2. However, the die passageways 144 are oriented to process material from the outside of the cylindrical mill to the inside. Each die 134 and 136 is supported centrally by a hub 146 keyed to a central shaft 148 and driving the die through set screws 150. The central portion of each die 134 and 136 over the hub 146 does not have die passageways 144. To prevent material from entering this area, a guard 152 directs material to either side of this central area. At each end of these cylindrical dies 134 and 136, small hubs 154 are positioned on the shaft 148 and support the dies through spokes 156. In order that the unit may be diassembled, it is necessary that at least one of the small hubs 154 and sets of spokes 156 must be separable from the cylindrical die.

Material is fed to the nip area of dies 134 and 136 where it is positively held and drawn between the two dies. A simple hopper arrangement is illustrated in phantom in FIG. 9 to contain this incoming material. As there is no clearance between the dies 134 and 136, all of the material must be forced into adjacent die passageways 144. As material passes through the passageways 144, it will extend into the inner space between the wall of the cylindrical dies 134 and 136 and the central shafts 148. Eventually these pellets will be broken off by other pellets or by contact with the central shaft 148. The pellets will then tend to migrate, influenced by additional pellets entering the central portion of the dies, to either end of the dies and into receiving hoppers 158 and 160. The hoppers 158 and 160 may be extended to substantially enclose the end portions of each die end where it is found that the pellets tend to be thrown at all angles from the mill.

Figure 11:
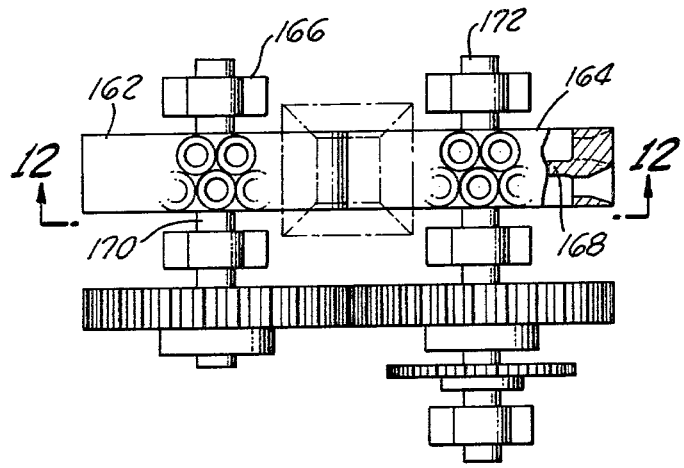
FIG. 11 is yet another embodiment of a pelletizing mill shown in plan.
Figure 12:
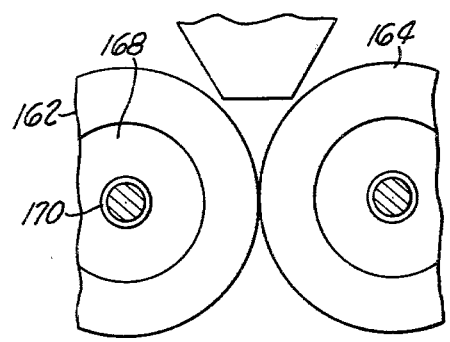
FIG. 12 is a cross-sectional elevation of FIG. 11 taken along line 12—12.

The embodiment of FIGS. 11 and 12 is in reality a smaller version of that seen in FIGS. 7, 8 and 9. Again, dies 162 and 164 are held in rolling contact by bearings 166 and are driven at the same speed by a sychronous driving arrangement, in this instance a gear train. The dies 162 and 164 have a central, circular web 168 extending into the hub 170 for rotation with a shaft 172. Such a system as disclosed in FIG. 10 would be used at smaller mills and processing plants where the rate at which useable products is created is relatively low.

Figure 13:
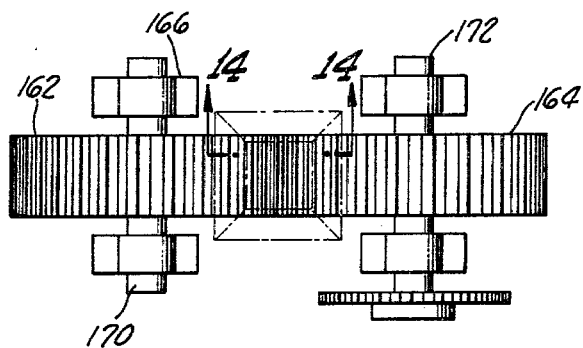
FIG. 13 is a plan of a modified embodiment of pelletizing mill of FIG. 11.
Figure 14:
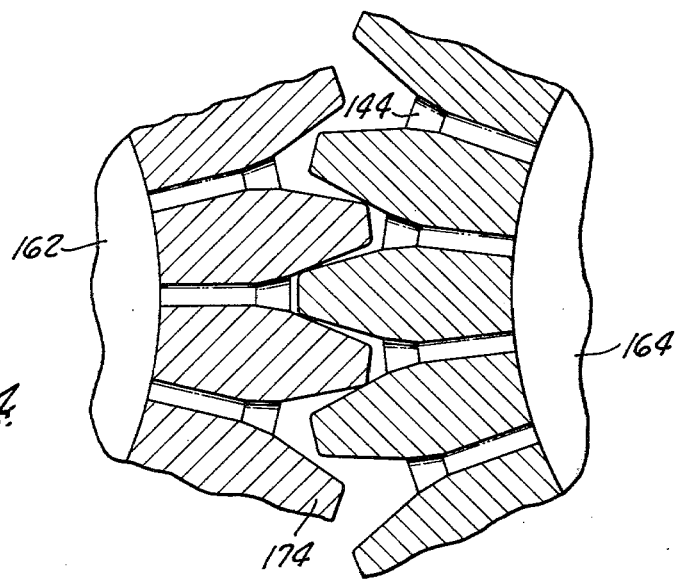
FIG. 14 is a cross-sectional elevation taken along line 14—14 of FIG. 13.

FIGS. 12 and 13 illustrate a variation of the embodiment as shown in FIG. 10. Specifically, gear teeth 174 are provided on the die surface itself thereby eliminating the need for a separate gear drive. This device is useful where greater compaction is necessary. Again, material is fed in a positive manner into the nip area above the gear shaped dies.

Figure 15:
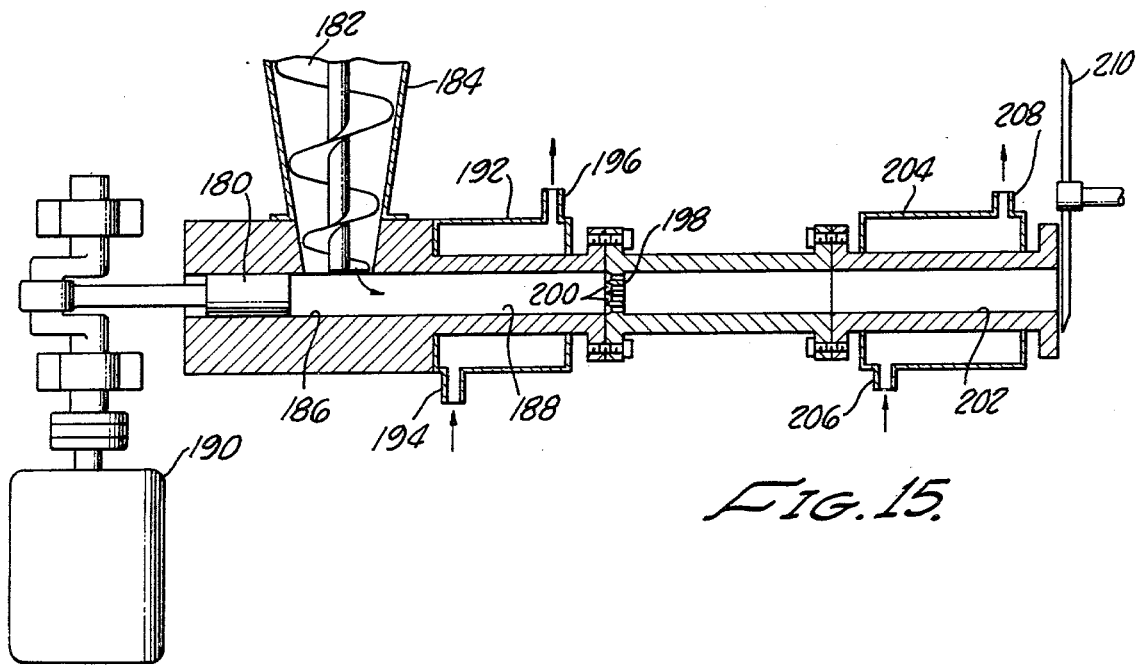
FIG. 15 is a further embodiment of a pelletizing mill of the present invention taken in cross section.

FIG. 15 illustrates yet another embodiment which differs substantially from the other embodiments in that a piston 180 or other means for advancing material such as a screw is employed as a means for forcing material through the die. This embodiment also employs preheating and cooling functions in the same apparatus. A positive feed system employing a conveyor screw 182 in a tapered chute 184 delivers material to a cylinder 186. The piston 180 repeatedly moves to and fro in the cylinder 186 to force incoming material into the preheating passageway 188. The piston 180 has a stroke which will not carry the rearwardlymost portion of the piston into the feed area such that material may fall behind the piston and be drawn from the cylinder 186 toward the drive mechanism generally designated 190.

The preheating passageway 188 includes a heating jacket 192 having an inlet 194 and an outlet 196. The jacket 192 surrounds the preheating passageway 188 and is capable of receiving hot air, oil or water in order that the material may be brought up to an appropriate temperature where the plasticizing of the resins and natural thermoplastics will occur.

Following the preheating passageway 188 is a die 198 having die passageways 200 similar to those fully described with respect to FIG. 2. The pelletized material is then allowed to continue under the influence of the piston 180 into a cooling passageway 202 enclosed in a cooling jacket 204 with inlet 206 and outlet 208 for the passage of cool water or the like therethrough. Finally, a slowly rotating blade 210 insures that the pellets will not be excessively long. This last embodiment is designed for small production facilities and is preferably portable.

Thus, a process and apparatus for pelletizing botanical material for use as industrial fuel is disclosed. While embodiments and applications of this invention have been shown and described, it would be apparent to those skilled in the art that many more modifications are possible without departing from the inventive concepts herein described. The invention, therefore, is not to be restricted except by the spirit of the appended claims.

What we claim is:

1. A combustible fuel pellet formed from botanical material including fiberized material, fines and bonding substances contained in the botanical materials, said pellet having a symmetrical configuration produced by passing the material under positive feed conditions through a constricted and elongated passage to heat and uniformly bond the fibers and bonding materials and densify the pellet, the cross-section dimension of formed pellet being not more than one-half inch, the density of the pellet being substantially uniform throughout the major portion thereof and in excess of 65 pounds per cubic foot, the surface of the pellet being smooth, and having a coating formed on the surface thereof from the natural bonding substances exuded from the botanical material, the produced pellet being relatively dry with an average moisture content of approximately 10% and the heat value of the pellet developing a BTU value approximating the bone dry BTU value of the material from which the pellet is formed.

2. A combustible fuel product as in claim 1 wherein the pellet is formed from tree bark.

3. A combustible fuel product as in claim 1 wherein the pellet is formed from wood fibers.

4. A combustible fuel pellet as in claim 1 wherein the pellet is formed from a composition of tree bark and wood fibers.

5. Combustible fuel pellets formed from botanical fuel material produced by reducing the moisture content of the material to an average of approximately 12 percent, grinding the dried material to a size sufficiently small to pass through a screen having openings no greater than 0.95 cm., heating the ground material to within an average range of 90° C. to 121° C., forcing the dried, ground and heated material under substantial pressure and friction through extrusion passages having a cross-section not exceeding approximately 0.635 cm. and while being forced through the passages compacting the material to substantially increase the density of the formed pellets and simultaneously reducing the moisture content to approximately 10 percent and increasing the temperature of the pellets thereby causing the natural bonding agents in the material to plasticize throughout substantially the length and diameter of the formed pellets so as to produce a bonded pellet product having a smooth and plasticized surface coating and the formed pellets having the required properties and characteristics to provide an extended storage and shipping life in an atmospheric environment.

* * * * *